(12) United States Patent
Chi

(10) Patent No.: US 7,393,246 B2
(45) Date of Patent: Jul. 1, 2008

(54) TRANSFER CARD STRUCTURE

(75) Inventor: Hsueh-Jung Chi, Taipei County (TW)

(73) Assignee: Jess-Link Products Co., Ltd., Taipei County (TW)

( * ) Notice: Subject to any disclaimer, the term of this patent is extended or adjusted under 35 U.S.C. 154(b) by 0 days.

(21) Appl. No.: 11/837,740

(22) Filed: Aug. 13, 2007

(65) Prior Publication Data

US 2008/0076302 A1    Mar. 27, 2008

(30) Foreign Application Priority Data

Sep. 26, 2006   (TW)   .............................. 95217194 U

(51) Int. Cl.
*H01R 24/00* (2006.01)
(52) U.S. Cl. ...................................... 439/630
(58) Field of Classification Search ................ 439/630, 439/638, 489; 235/441
See application file for complete search history.

(56) References Cited

U.S. PATENT DOCUMENTS

| | | | | |
|---|---|---|---|---|
| 6,039,599 | A | * | 3/2000 | Benjamin et al. ........... 439/489 |
| 6,165,021 | A | * | 12/2000 | Bourne ......................... 439/630 |
| 6,869,302 | B2 | * | 3/2005 | Bricaud et al. .............. 439/326 |
| 7,112,074 | B2 | * | 9/2006 | Nakai et al. .................. 439/159 |
| 7,234,969 | B2 | * | 6/2007 | Chang et al. ................. 439/630 |
| 7,288,004 | B1 | * | 10/2007 | Hou et al. .................... 439/630 |
| 2007/0034699 | A1 | * | 2/2007 | Lin ............................. 235/486 |
| 2007/0218768 | A1 | * | 9/2007 | Lee ............................ 439/630 |

FOREIGN PATENT DOCUMENTS

TW            M265796         5/2005

* cited by examiner

*Primary Examiner*—Michael C Zarroli
(74) *Attorney, Agent, or Firm*—Rosenberg, Klein & Lee

(57) ABSTRACT

A transfer card structure includes a lower cover and an upper cover combined with the lower cover thereon. A terminal module is disposed between the upper cover and the lower cover. The terminal module has an insulation plate, a plurality of terminals, and an individual contact. The terminals and the individual contact are embedded in the insulation plate. The terminals include a plurality of touch portions and pin portions respectively on a front edge and on a rear edge of the insulation plate. A short portion is further arranged between the touch portions and the pin portions. The short portion includes a first bridge portion bent from a respective one of the terminals, and a second bridge portion bent from the individual contact. Therefore, a short circuit is caused via the terminals and the individual contact that connect with each other in order to lower production costs.

7 Claims, 4 Drawing Sheets

TRANSFER CARD STRUCTURE

BACKGROUND OF THE INVENTION

1. Field of the Invention

The present invention relates to a transfer card structure, and particularly relates to a transfer card structure enabling a short circuit occurring between specific two terminals due to the middle portions of the conductive materials thereof.

2. Description of Related Art

A conventional transfer card disclosed in Taiwan No. 93217570 Improvement structure of transfer card, published on May 21, 2005, includes two upper bent portions connected with each other via a contact portion in order to cause a short circuit. The two upper bent portions are formed at the rear ends of two specific terminals respectively. The contact portion is used to bridge the two upper bent portions to cause the short circuit.

Obviously, although the conventional transfer card provides the necessary short circuit, surplus material for making the upper bent portions at rear ends of the two specific terminals should be prepared. The more surplus material there is, the more the square measure of the base material is punched. Thus, the amount of waste material left over results in unnecessary usage and raises production costs.

Hence, an improvement over the prior art is required to overcome the disadvantages thereof.

SUMMARY OF THE INVENTION

The object of the preset invention is therefore to specify a transfer card structure having two bridge portions made integrally from a terminal and an individual contact for contacting each other so as to create a short circuit.

According to the preset invention, the object is achieved by providing a transfer card structure having two raised points made integrally from a first terminal and a switch member operating together with the two raised points for making a write-protection switch device. The switch member can match either of the two raised points and be orientated at either of the positions so that the write-protection function can be turned on or off via the switch member.

According to the preset invention, the object is achieved by further providing a transfer card structure including a lower cover, an upper cover combined with the lower cover thereon, and a terminal module disposed between the upper cover and the lower cover. The terminal module has a plurality of terminals, an individual contact, a short portion, and an insulation plate. The terminals and the individual contact are embedded in the insulation plate and separated by intervals. The terminals include a plurality of touch portions on a front edge of the insulation plate and a plurality of pin portions on a rear edge of the insulation plate. The short portion is arranged between the touch portions and the pin portions. Furthermore, the short portion includes a first bridge portion and a second bridge portion connected with each other for enabling a short circuit. The first bridge portion is extendedly extended by bending from a middle portion of a respective one of the terminals, and the second bridge portion is extendedly bent from a middle portion of the individual contact.

According to the preset invention, the advantage of the present transfer card structure is that it uses materials effectively and efficiently by enabling a short circuit to occur directly between the first terminal and the individual contact due to the middle portions of the conductive materials. Therefore, the short portion is molded easier than through the conventional method and decreases production costs.

Likewise, the write-protection switch device can be accomplished via the integrally made two raised points that operate together with the switch member. No further design changes for the lower cover that mates with the switch member are needed. The cost of the plastic module is thereby decreased.

To provide a further understanding of the preset invention, the following detailed description illustrates embodiments and examples of the present invention. Examples of the more important features of the preset invention have thus been summarized broadly in order that the detailed description thereof that follows may be better understood, and in order that the contributions to the art may be appreciated. There are, of course, additional features of the preset invention that will be described hereinafter which will form the subject of the claims appended hereto.

BRIEF DESCRIPTION OF THE DRAWINGS

These and other features, aspects, and advantages of the present invention will become better understood with regard to the following description, appended claims, and accompanying drawings, where:

DETAILED DESCRIPTION OF THE EMBODIMENTS

Figure 1:
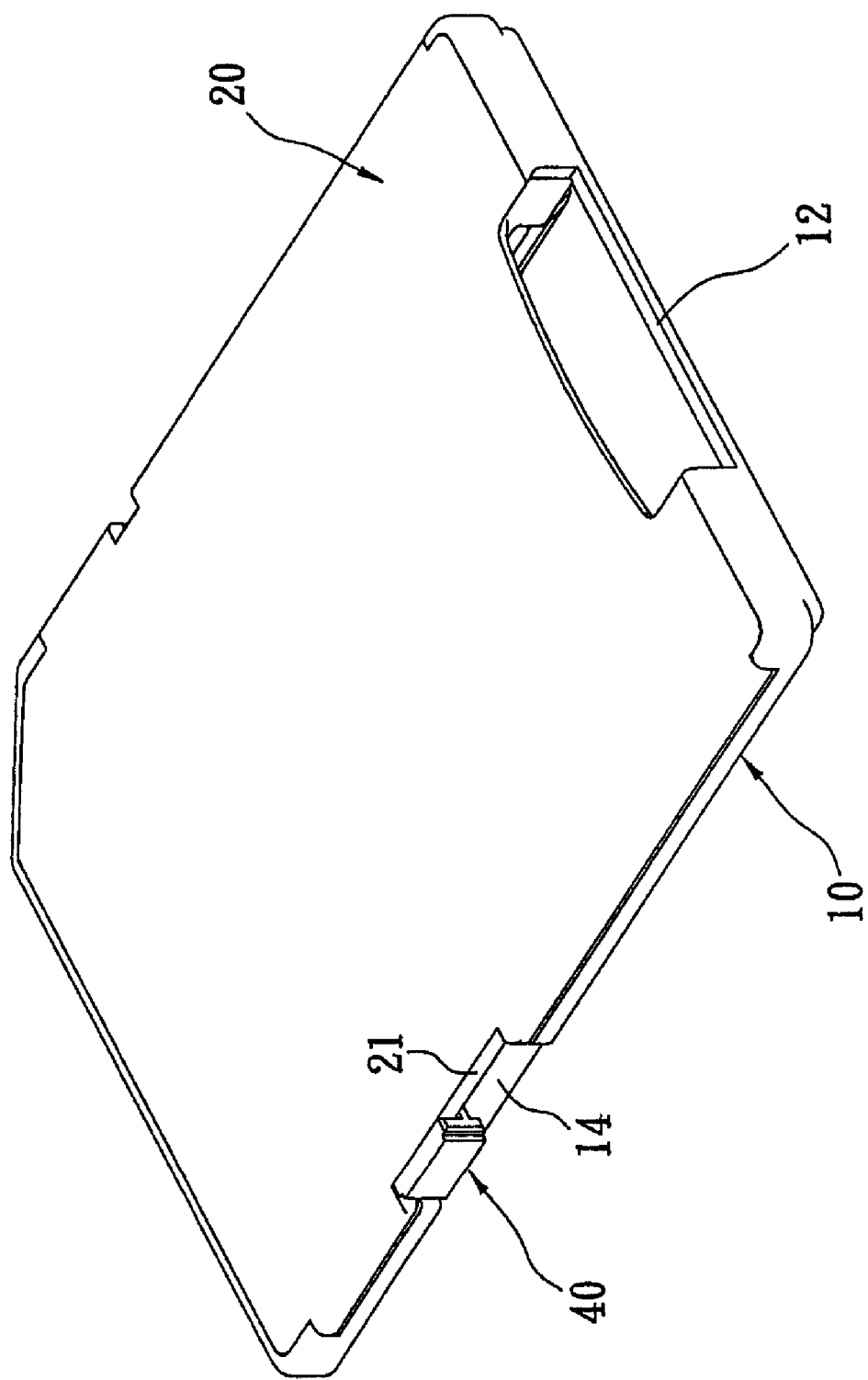
FIG. 1 is a perspective view of a transfer card structure according to the present invention.
Figure 2:
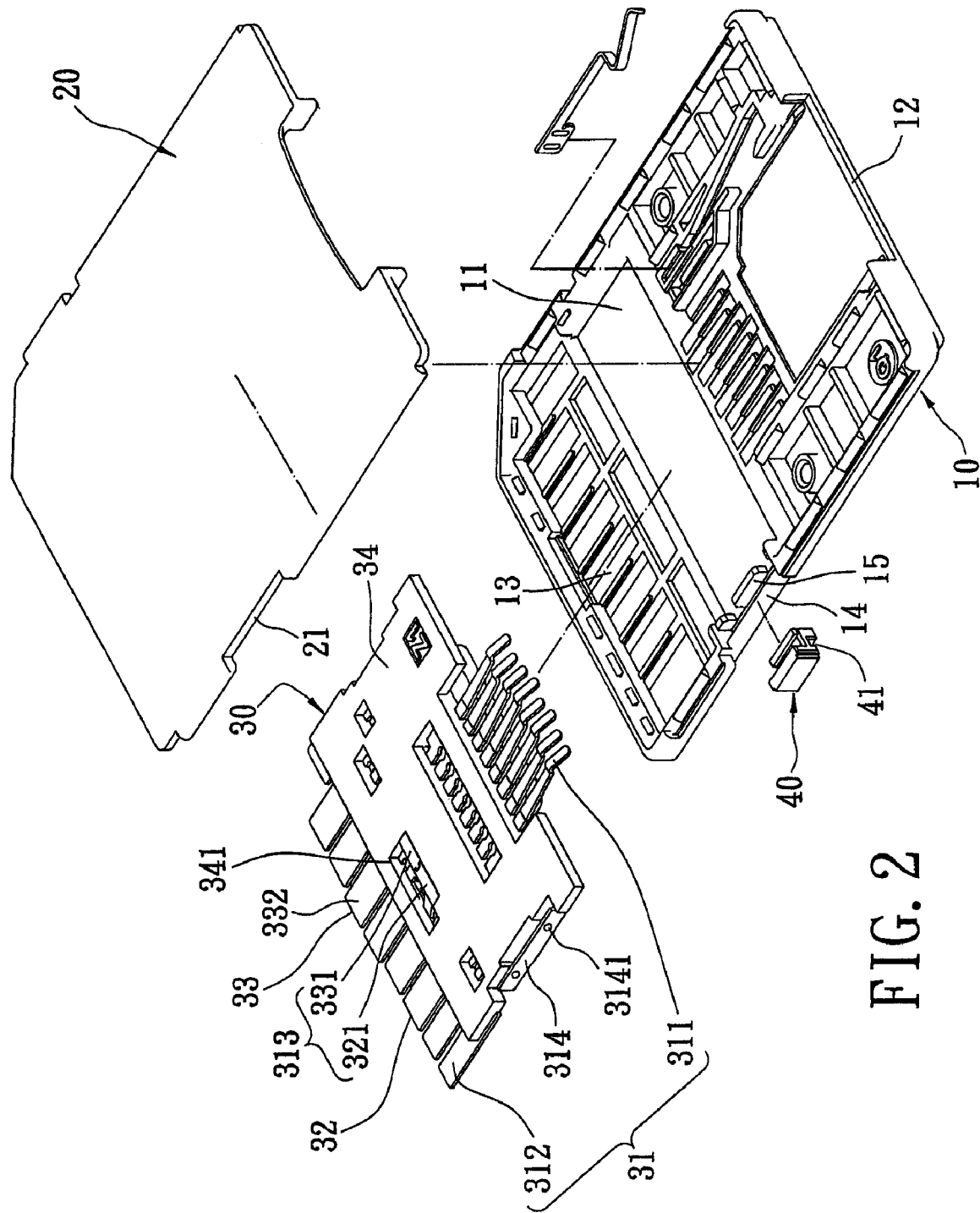
FIG. 2 is a decomposition view of the transfer card structure according to the present invention.
Figure 3A:
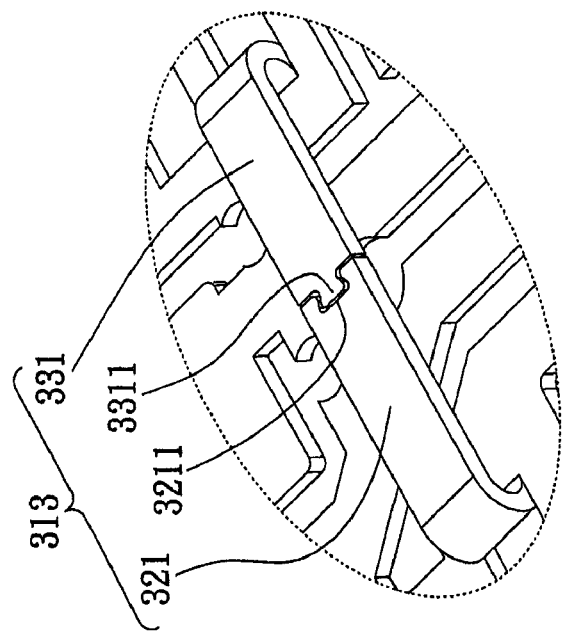
FIG. 3A is an enlarged view of FIG. 3.
Figure 3:
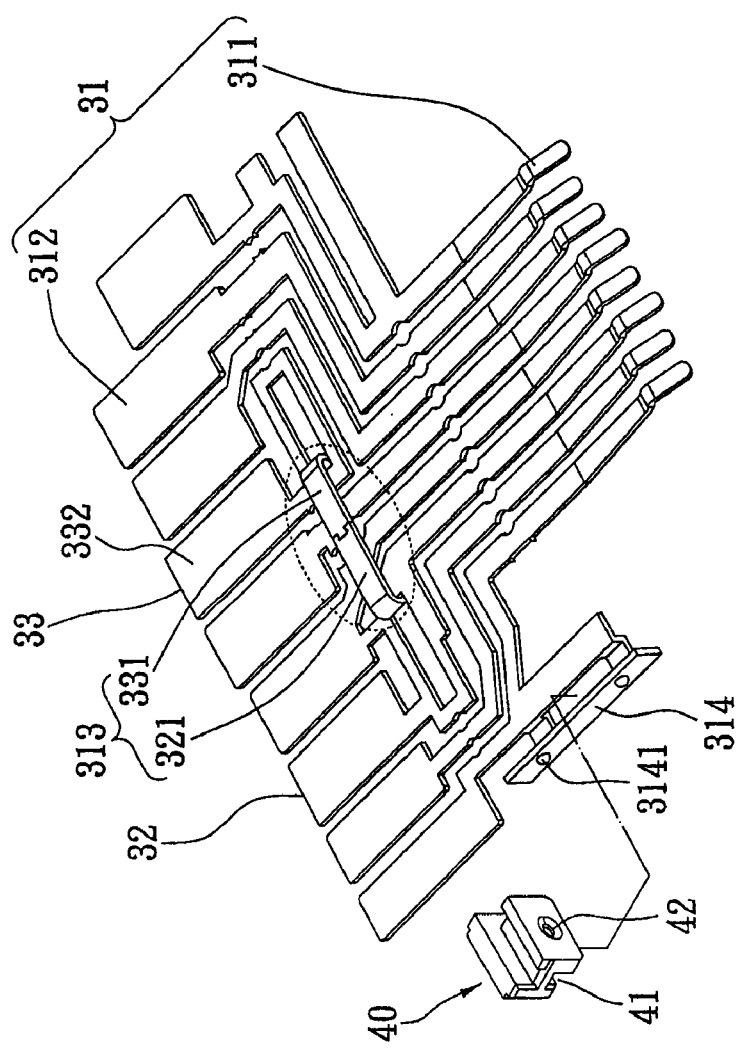
FIG. 3 is a perspective view illustrating terminals and a switch member according to the card structure of the present invention.
Figure 4:
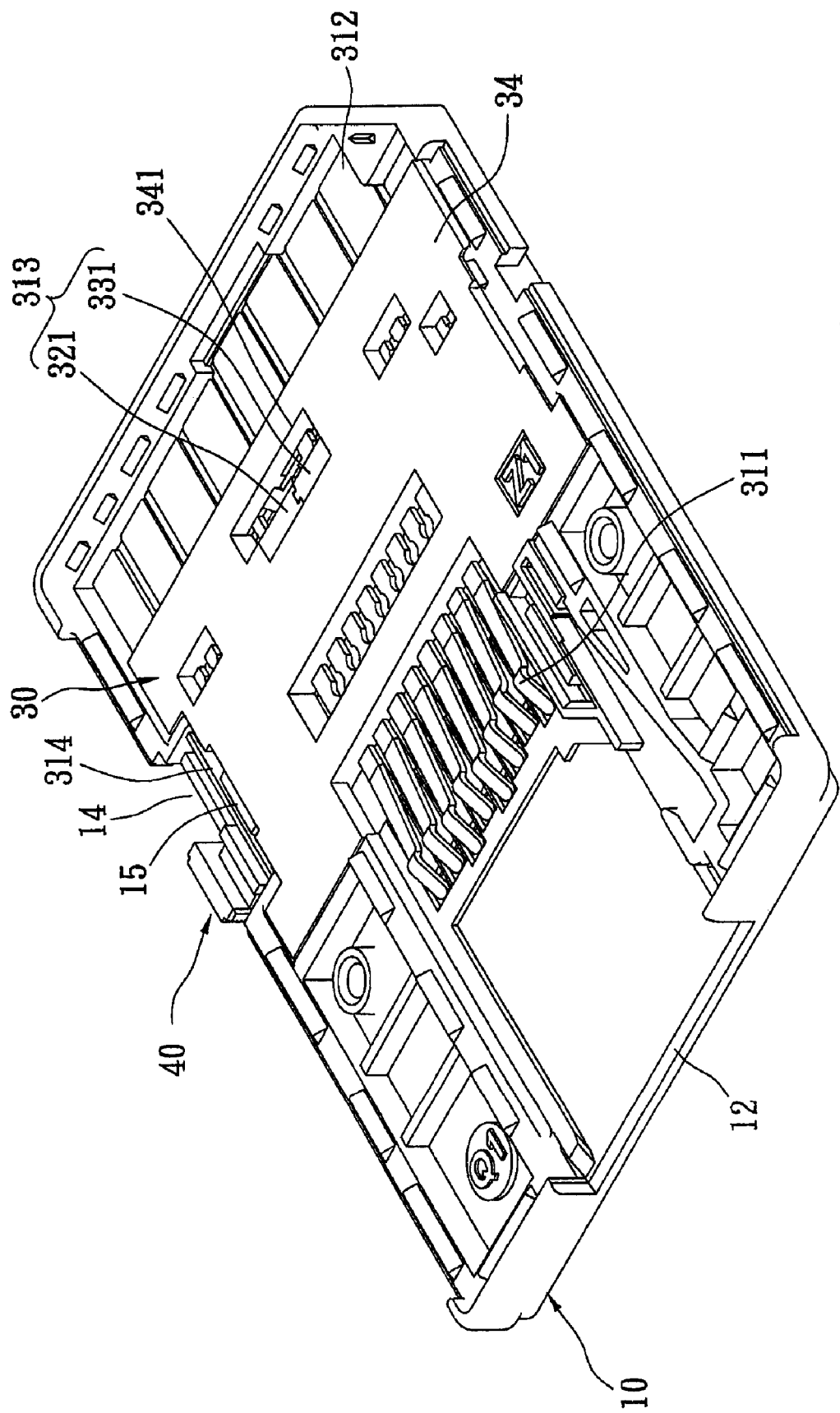
FIG. 4 is a perspective view illustrating a terminal module and a lower cover according to the card structure of the present invention.

Please refer to FIGS. 1 to 4, which show a transfer card structure according to the present invention. The transfer card structure includes a lower cover 10, an upper cover 20, a terminal module 30, and a switch member 40.

The lower cover 10 is made of insulation plastic material. The lower cover 10 has a reception cavity 11 formed therein. The lower cover 10 has an insertion slot 12 formed on a front edge thereof for allowing an electronic card (not shown) to be inserted therein; a plurality of openings 13 is formed on a rear edge thereof; a lower notch 14 is formed on a left side thereof; and a rib 15 is disposed adjacent to the lower notch 14.

The upper cover 20 is made of insulation plastic materials and combined with the lower cover 10 thereon. The upper cover 20 has an upper notch 21 formed on left side thereof for connecting with the lower notch 14.

The terminal module 30 is disposed in the reception cavity 11 and between the upper cover 20 and the lower cover 10. The terminal module 30 has a plurality of terminals 31, an individual contact 33, and an insulation plate 34. The terminals 31 and the individual contact 33 are arranged next to each other. The terminals 31 include a plurality of touch portions 311 on a front edge of the insulation plate 34, and a plurality of pin portions 312 on a rear edge of the insulation plate 34. The touch portions 311 are inserted into the reception cavity 11 for electrically connecting with the electronic card that has been inserted into the insertion slot 12. The pin portions 312 are exposed out from the openings 13 of the lower cover 10 respectively for electrically connecting with corresponding contacts (not shown) of an electronic card connector.

The individual contact 33 includes a contact pin portion 332 on the rear edge of the insulation plate 34. The contact pin portion 332 is also exposed out from a respective one of the openings 13 and arranged next to the pin portions 312 of the terminals 31.

The terminal module further includes a short portion 313 arranged between the touch portions 311 and the pin portions 312. The short portion 313 includes a first bridge portion 321 and a second bridge portion 331. The first bridge portion 321 is extendedly bent from a middle portion of a respective one 32 of the terminals 31. The first bridge portion 321 has a recess unit 3211 formed on an end thereof, and the recess unit 3211 has a dovetail-groove shape.

The second bridge portion 331 is extendedly bent from a middle portion of the individual contact 33. The second bridge portion 331 has a protrusion unit 3311 formed on an end thereof. The protrusion unit 3311 has a dovetail shape in order to fit with the recess unit 3211 of the respective terminal 32. Therefore, the first bridge portion 321 and the second bridge portion 331 connect with each other in order to assembly with the short portion 313 for enabling a short circuit to occur between the terminal 32 and the individual contact 33.

The terminal module 30 includes a stand plate 314 disposed on a left lateral side thereof. The stand plate 314 is bent from a middle portion of the outermost one of the terminals 31. The stand plate 314 has two raised points 3141 facing the lower notch 14 of the lower cover 10 and separated from each other. The rib 15 of the lower cover 10 abuts against an interior of the stand plate 314 to support the stand plate 314 and increase the strength of the structure.

The insulation plate 34 is made of isolation materials. The terminals 31 and the individual contact 33 are embedded in the insulation plate 34 in an insert-molding manner. The insulation plate 34 wraps around the terminals 31 and the individual contact 33 so as to keep them spaced apart at intervals. The insulation plate 34 further includes a slot 341 relating to the short portion 313. The short portion 313 can be exposed via the slot 341.

The switch member 40 is arranged in the upper notch 21 and the lower notch 14 between the upper cover 20 and the lower cover 10. The switch member 40 has a guiding slot 41 formed on a bottom thereof. The switch member 40 slides on the lower cover 10 because the guiding slot 41 mates with a lateral wall surrounding the lower notch 14. The switch member 40 has an indentation 42 that can mate with either one of the raised points 3141 of the stand plate 314 so as to provide the write-protection switch function. The two raised points 3141, which are capable of pushing for orientating the switch member 40 and operating with the switch member 40 together thereby can accomplish a write-protection switch device. Consequently, the write-protection function can be served by switched on and off.

The two bridge portions 321, 331 are bent directly from the terminal 32 and the individual contact 33 of the transfer card structure according to the present invention respectively. When the two bridge portions 321, 331 connect to each other, they are assembled form the short portion 313 to cause a short circuit between the terminal 32 and the individual contact 33. In comparison with the prior art, no surplus material should be left behind the terminal 32 and the individual contact 33. Thereby, the square measure of the base material of the terminal 32 and the individual contact 33 are not required. The waste material is reduced or can be omitted, and production costs are therefore reduced.

In addition, the stand plate 314 extending from the lateral side of the terminal 31 and the two raised points 3141 integrally made by mating with the switch member 40 are disclosed to provide the write-protection switch function according to the present invention. Moreover, no further design changes to the lower cover 10 mating with the switch member are needed. Therefore the construction of the lower cover 10 is simplified, the costs of the plastic module are reduced, and the manufacturing cost of the device is lowered.

It should be apparent to those skilled in the art that the above description is only illustrative of specific embodiments and examples of the preset invention. The preset invention should therefore cover various modifications and variations made to the herein-described structure and operations of the preset invention, provided they fall within the scope of the preset invention as defined in the following appended claims.

What is claimed is:

1. A transfer card structure, comprising:
   a lower cover;
   an upper cover combined with the lower cover thereon; and
   a terminal module disposed between the upper cover and the lower cover; the terminal module having a plurality of terminals, an individual contact, a short portion, and an insulation plate;
   wherein the terminals and the individual contact are embedded in the insulation plate and are separated at intervals; the terminals include a plurality of touch portions on a front edge of the insulation plate, and a plurality of pin portions on a rear edge of the insulation plate; the short portion is arranged between the touch portions and the pin portions;
   wherein the short portion includes a first bridge portion and a second bridge portion connected with each other for enabling a short circuit; wherein the first bridge portion is extendedly bent from a middle portion of a respective one of the terminals, and the second bridge portion is extendedly bent from a middle portion of the individual contact.

2. The transfer card structure as claimed in claim 1, wherein the first bridge portion has a recess unit and the second bridge portion has a protrusion unit, the recess unit and the protrusion unit match each other.

3. The transfer card structure as claimed in claim 2, wherein the recess unit has a dovetail-groove shape.

4. The transfer card structure as claimed in claim 2, wherein the protrusion unit has a dovetail shape.

5. The transfer card structure as claimed in claim 1, wherein the terminal module includes a stand plate disposed at a lateral side thereof, the stand plate is bent from a middle portion of the outermost one of the terminals, and the stand plate has two raised points separated from each other.

6. The transfer card structure as claimed in claim 5, further including a switch member arranged between the upper cover and the lower cover; wherein the switch member has an indentation capable of mating with either one of the raised points.

7. The transfer card structure as claimed in claim 1, wherein the individual contact includes a contact pin portion on the rear edge of the insulation plate, the contact pin portion is arranged next to the pin portions of the terminals.

* * * * *